United States Patent
Sole et al.

(10) Patent No.: US 9,736,500 B2
(45) Date of Patent: Aug. 15, 2017

(54) METHODS AND APPARATUS FOR SPATIALLY VARYING RESIDUE CODING

(75) Inventors: Joel Sole, La Jolla, CA (US); Xiaoan Lu, Princeton, NJ (US); Yunfei Zheng, San Diego, CA (US); Peng Yin, Ithaca, NY (US); Qian Xu, Folsom, CA (US)

(73) Assignee: THOMSON LICENSING, Issy les Moulineaux (FR)

( * ) Notice: Subject to any disclaimer, the term of this patent is extended or adjusted under 35 U.S.C. 154(b) by 656 days.

(21) Appl. No.: 13/382,394

(22) PCT Filed: Jul. 1, 2010

(86) PCT No.: PCT/US2010/001884
§ 371 (c)(1),
(2), (4) Date: Jan. 5, 2012

(87) PCT Pub. No.: WO2011/005303
PCT Pub. Date: Jan. 13, 2011

(65) Prior Publication Data
US 2012/0099642 A1    Apr. 26, 2012

Related U.S. Application Data

(60) Provisional application No. 61/223,277, filed on Jul. 6, 2009.

(51) Int. Cl.
*H04N 19/12* (2014.01)
*H04N 19/86* (2014.01)
(Continued)

(52) U.S. Cl.
CPC ............. *H04N 19/86* (2014.11); *H04N 19/12* (2014.11); *H04N 19/122* (2014.11);
(Continued)

(58) Field of Classification Search
CPC .................................. H04N 7/26; H04N 19/86
(Continued)

(56) References Cited

U.S. PATENT DOCUMENTS 5,915,046 A    6/1999   Echigo et al.
6,028,634 A *  2/2000   Yamaguchi ............... G06T 3/40
                                              375/240.16
(Continued)

FOREIGN PATENT DOCUMENTS

CN    101336549    12/2008
CN    101415121    4/2009
(Continued)

OTHER PUBLICATIONS

Li et al, Second Order Prediction on H.264/AVC, National Basic Research Program of China (973) under Grants No. 2009CB320900, pp. 1-4.*
(Continued)

*Primary Examiner* — Jay Patel
*Assistant Examiner* — Irfan Habib
(74) *Attorney, Agent, or Firm* — Brian J. Dorini; Xiaoan Lu

(57) ABSTRACT

Methods and apparatus are provided for spatially varying residue coding. An apparatus includes a video encoder (300) for encoding picture data for at least a block in a picture by selecting a spatially varying encoding method for a residue corresponding to a difference between an original version of the block and at least one reference block. One or more transforms are used to transform a portion of the block and a remaining area of the block is encoded using an alternate encoding method with respect to the one or more transforms or is not encoded.

32 Claims, 10 Drawing Sheets

(51) Int. Cl.
*H04N 19/176* (2014.01)
*H04N 19/46* (2014.01)
*H04N 19/122* (2014.01)
*H04N 19/61* (2014.01)
*H04N 19/33* (2014.01)

(52) U.S. Cl.
CPC ........... *H04N 19/176* (2014.11); *H04N 19/33* (2014.11); *H04N 19/46* (2014.11); *H04N 19/61* (2014.11)

(58) Field of Classification Search
USPC .................................................... 375/240.03
See application file for complete search history.

(56) References Cited

U.S. PATENT DOCUMENTS

| | | | | |
|---|---|---|---|---|
| 8,576,924 | B2* | 11/2013 | Kwan | H04N 19/176 375/240.29 |
| 9,106,933 | B1* | 8/2015 | Bankoski | H04N 19/176 |
| 9,131,244 | B2* | 9/2015 | Kim | H04N 19/139 |
| 9,167,268 | B1* | 10/2015 | Gu | H04N 19/172 |
| 9,247,251 | B1* | 1/2016 | Bultje | H04N 19/00763 |
| 9,344,742 | B2* | 5/2016 | Xu | H04N 19/61 |
| 9,426,487 | B2* | 8/2016 | Zheng | H04N 19/176 |
| 9,521,407 | B2* | 12/2016 | Zheng | H04N 19/70 |
| 9,531,990 | B1* | 12/2016 | Wilkins | H04N 7/00 |
| 9,609,343 | B1* | 3/2017 | Chen | H04N 19/107 |
| 9,615,100 | B2* | 4/2017 | Gu | H04N 19/176 |
| 2004/0047512 | A1* | 3/2004 | Handley | H04N 19/122 382/250 |
| 2006/0139188 | A1* | 6/2006 | Sasakura | H03M 7/3084 341/51 |
| 2007/0160146 | A1* | 7/2007 | Bright | H04N 19/45 375/240.16 |
| 2008/0049834 | A1* | 2/2008 | Holcomb | H04N 19/136 375/240.2 |
| 2008/0285644 | A1* | 11/2008 | Seo | H04N 19/159 375/240.2 |
| 2009/0002379 | A1* | 1/2009 | Baeza | G06T 1/20 345/522 |
| 2009/0097571 | A1* | 4/2009 | Yamada | H04N 19/197 375/240.25 |
| 2009/0257664 | A1 | 10/2009 | Kao et al. | |
| 2010/0195715 | A1* | 8/2010 | Liu | H04N 19/176 375/240.02 |
| 2011/0249746 | A1* | 10/2011 | Yang | H04N 7/0102 375/240.16 |
| 2011/0286516 | A1* | 11/2011 | Lim | H04N 7/17318 375/240.03 |
| 2012/0008683 | A1* | 1/2012 | Karczewicz | H04N 19/159 375/240.12 |
| 2012/0027084 | A1* | 2/2012 | Zhang | H04N 19/196 375/240.12 |
| 2012/0177112 | A1* | 7/2012 | Guo | H04N 19/13 375/240.12 |
| 2012/0177118 | A1* | 7/2012 | Karczewicz | H04N 19/137 375/240.13 |
| 2012/0177120 | A1* | 7/2012 | Guo | H04N 19/159 375/240.16 |
| 2012/0195366 | A1* | 8/2012 | Liu | H04N 19/159 375/240.02 |
| 2012/0314766 | A1* | 12/2012 | Chien | H04N 19/176 375/240.12 |
| 2013/0028329 | A1* | 1/2013 | Lou | H04N 19/176 375/240.18 |
| 2013/0114707 | A1* | 5/2013 | Seregin | H04N 19/11 375/240.12 |
| 2014/0086323 | A1* | 3/2014 | Chuang | H04N 19/159 375/240.12 |
| 2014/0301436 | A1* | 10/2014 | Wang | H04N 19/70 375/240.02 |

FOREIGN PATENT DOCUMENTS

| | | | |
|---|---|---|---|
| CN | 101448162 | 6/2009 | |
| EP | 0905987 | 3/1999 | |
| EP | 779742 | 5/2002 | |
| EP | 1379089 | 1/2004 | |
| EP | 1811785 | 7/2007 | |
| JP | 05022715 | 1/1993 | |
| JP | 05-207287 | 8/1993 | |
| JP | 09205652 | 8/1997 | |
| JP | 11164321 | 6/1999 | |
| JP | 2000270334 | 1/2000 | |
| JP | 2002315004 | 10/2002 | |
| JP | 2003204550 | 7/2003 | |
| JP | 2005-039428 | 2/2005 | |
| JP | 2005167655 | 6/2005 | |
| JP | 2008109424 | 10/2006 | |
| JP | 2008219205 | 9/2008 | |
| JP | 2010509842 | 3/2010 | |
| KR | WO 2008035842 A1 * | 3/2008 | ........... H04N 19/176 |
| WO | WO2007064082 | 6/2007 | |
| WO | WO2007094329 | 8/2007 | |
| WO | 2008-110535 A1 | 9/2008 | |
| WO | WO2009021062 | 2/2009 | |
| WO | WO2010017837 | 2/2010 | |
| WO | WO2010051846 A1 | 5/2010 | |

OTHER PUBLICATIONS

Zhang et al., Video Coding Using Spatially Varying Transform, T. Wada, F. Huang, and S. Lin (Eds.): PSIVT 2009, LNCS 5414, pp. 796-806, 2009.*
Lee et al, H.263-Based SNR Scalable Video Codec, IEEE Transactions on Consumer Electronics, vol. 43, No. 3, August 1997, pp. 614-622.*
Gisle et al. ("Definition of New Coding elements from Telenor", 10. VCEG Meeting, May 9, 2000).*
De Lima Filho et al., "Universal Image Compression Using Multiscale Recurrent Patterns with Adaptive Probability Model", IEEE Transactions on Image Processing, vol. 17, No. 4, Apr. 2008, pp. 512-527.
Lee et al., "H.263-Based SNR Scaiabie Video Codec", IEEE Electronics, Voi. 43, No. 3, Aug. 1997, pp. 614-622.
Li et al., "Second Order Prediction on H.264/AVC", Picture Coding Symposium 2009, Chicao, IL, May 6, 2009.
Narroschke et al., "Adaptive Prediction Error Coding in Spatial and Frequency Domain in the KTA Reference Model", International Organisation for Standardisation, ISO/IEC JTC1/SC29/WG11, Montreux, CH, Mar. 28, 2006.
Rodrigues et al., "H.264/AVC Based video Coding Using Multiscale Recurrent Patterns: First Results", Content Processing and Representation Lecuture Notes in Computer Science, LNCS, Berlin, DE, Jan. 1, 2006, pp. 107-114.
Zhang et al., "Video Coding Using Spatially Varying Transform", Proceedings of the 3rd Pacific Rim Symposium on Advanced in Image and Video Technology, vol. 5414, Berlin, Heidelberg, Jan. 13, 2009, pp. 796-806.
ITU-T H.264 Standard, "Advanced Video Coding for Generic Audiovisual Services", International Telecommunication Union, Mar. 2005, 343 pages.
Narroschke, et al., "Adaptive prediction error coding in spatial and frequency domain with a fixed scan in the spatial domain", ITU Telecommunications Standardization Sector, Oct. 2008, pp. 1-15, Hangzhou, China.
PCT International Search Report dated Jul. 1, 2010.
JPEG Standard: Terminal Equipment and Protocols for Telematic Services, Information Technology—Digital Compression and Coding of Continuous-Tone Still Images—Requirements and Guidelines, Recommendation T.81, Sep. 1992, pp. 1-182.
MPEG1 standard: ISO/IEC 11172-2, Information technology—coding of moving pictures and associated audio for digital storage media at up to about 1.5 Mbit/s. Part 2: Video, Aug. 1, 1993, 120 pages.

(56) References Cited

OTHER PUBLICATIONS

MPEG2 standard: ISO/IEC 13818-2, Information technology—Generic coding of moving pictures and associated audio information: Video, May 15, 1996, 212 pages.
MPEG4 standard: ISO/IEC 14496-2 Information technology—Coding of audio-visual objects—Part 2: Visual, Jun. 1, 2004, 726 pages.
H263 standard: Series H: Audiovisual and Multimedia Systems Infrastructure of audiovisual services—Coding of moving video, "Video coding for low bit rate communication", Jan. 2005, 226 pages.

* cited by examiner

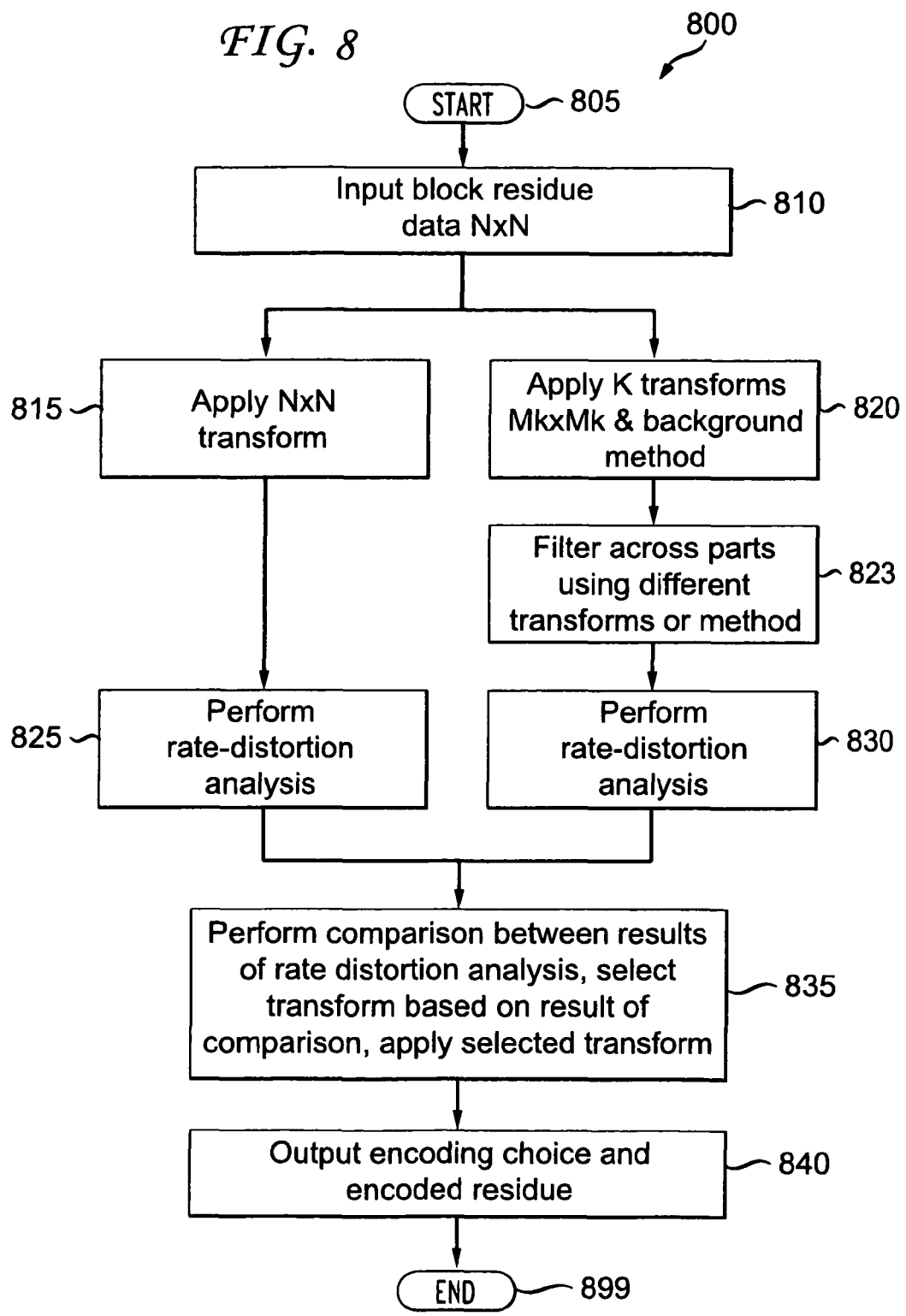

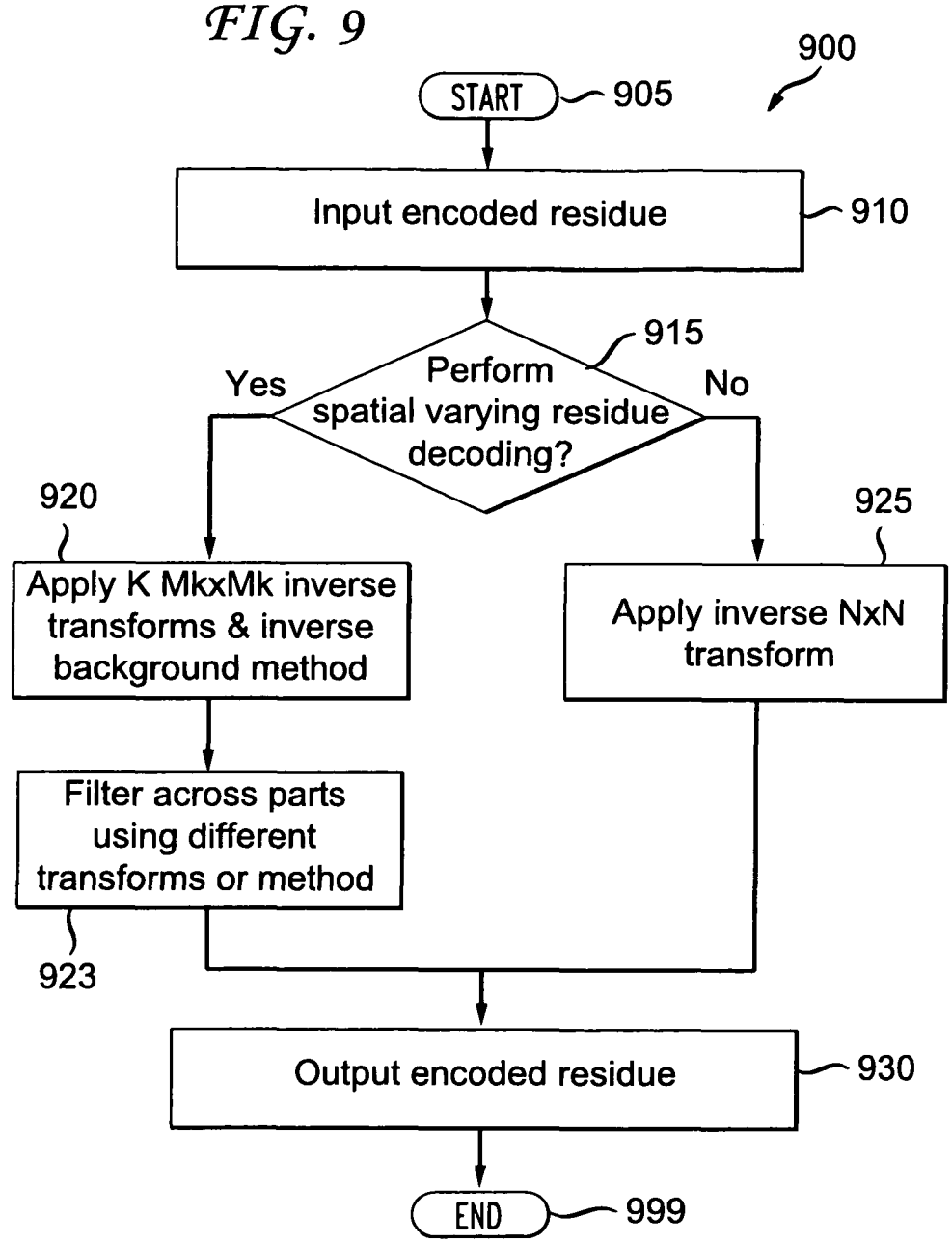

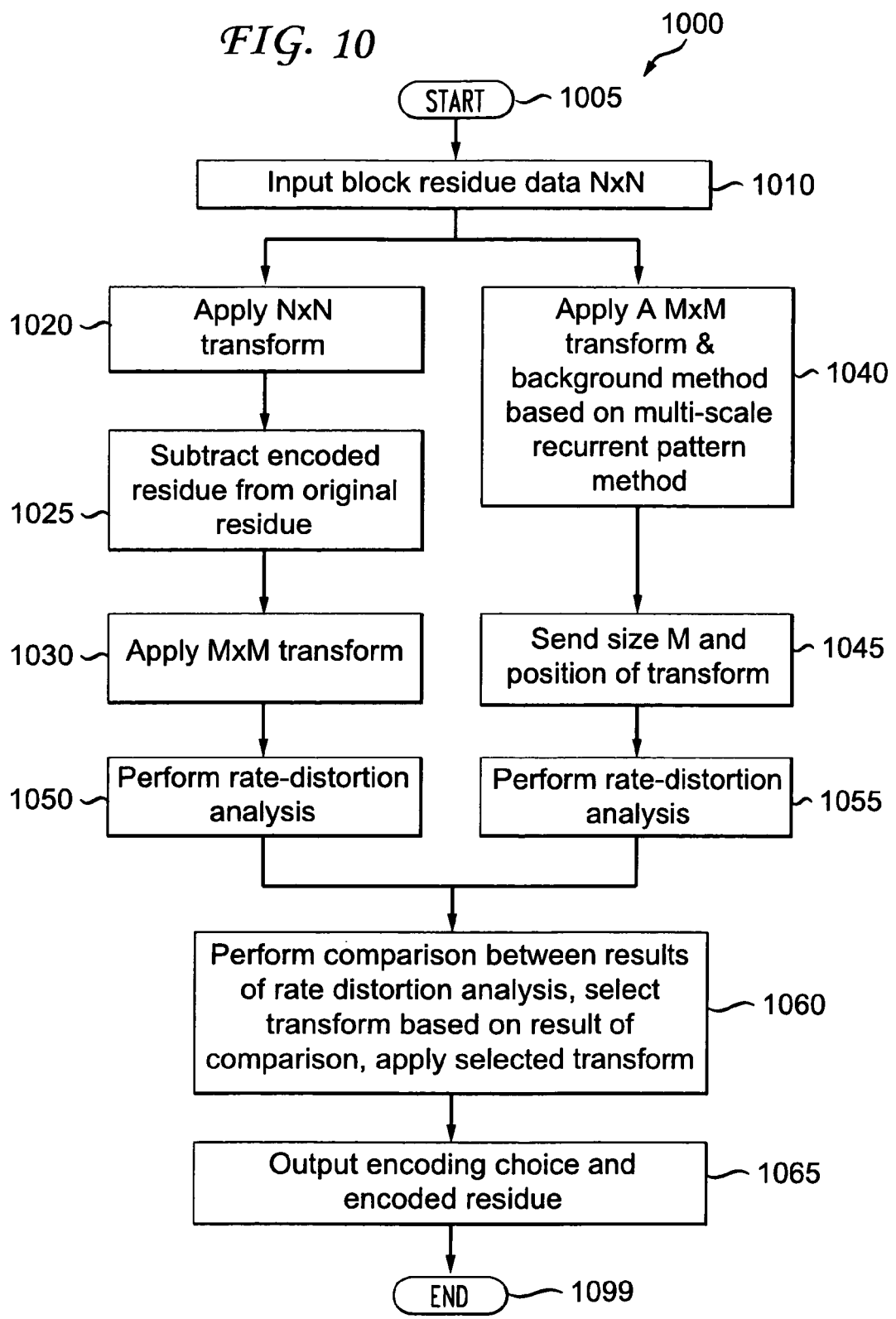

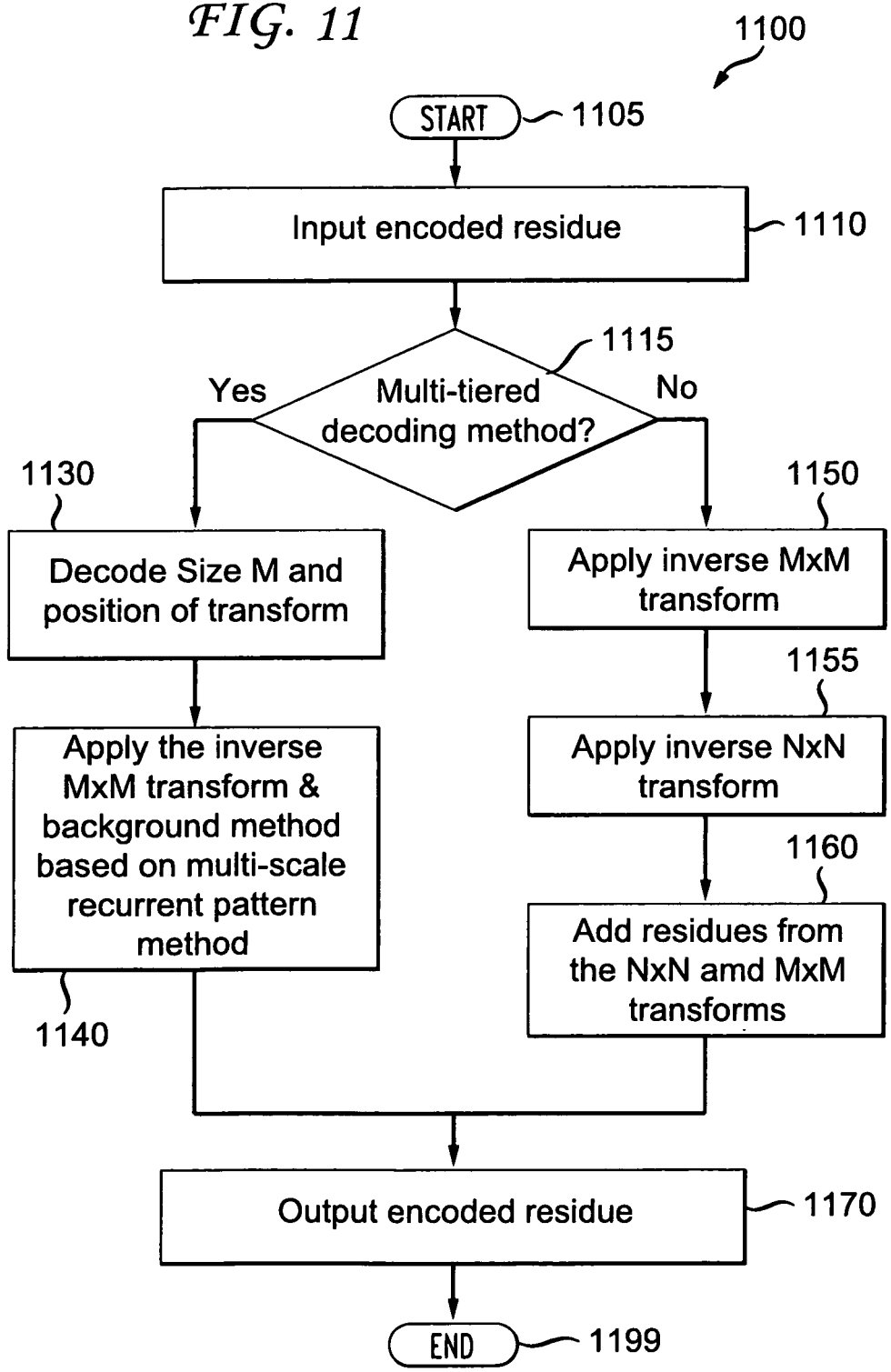

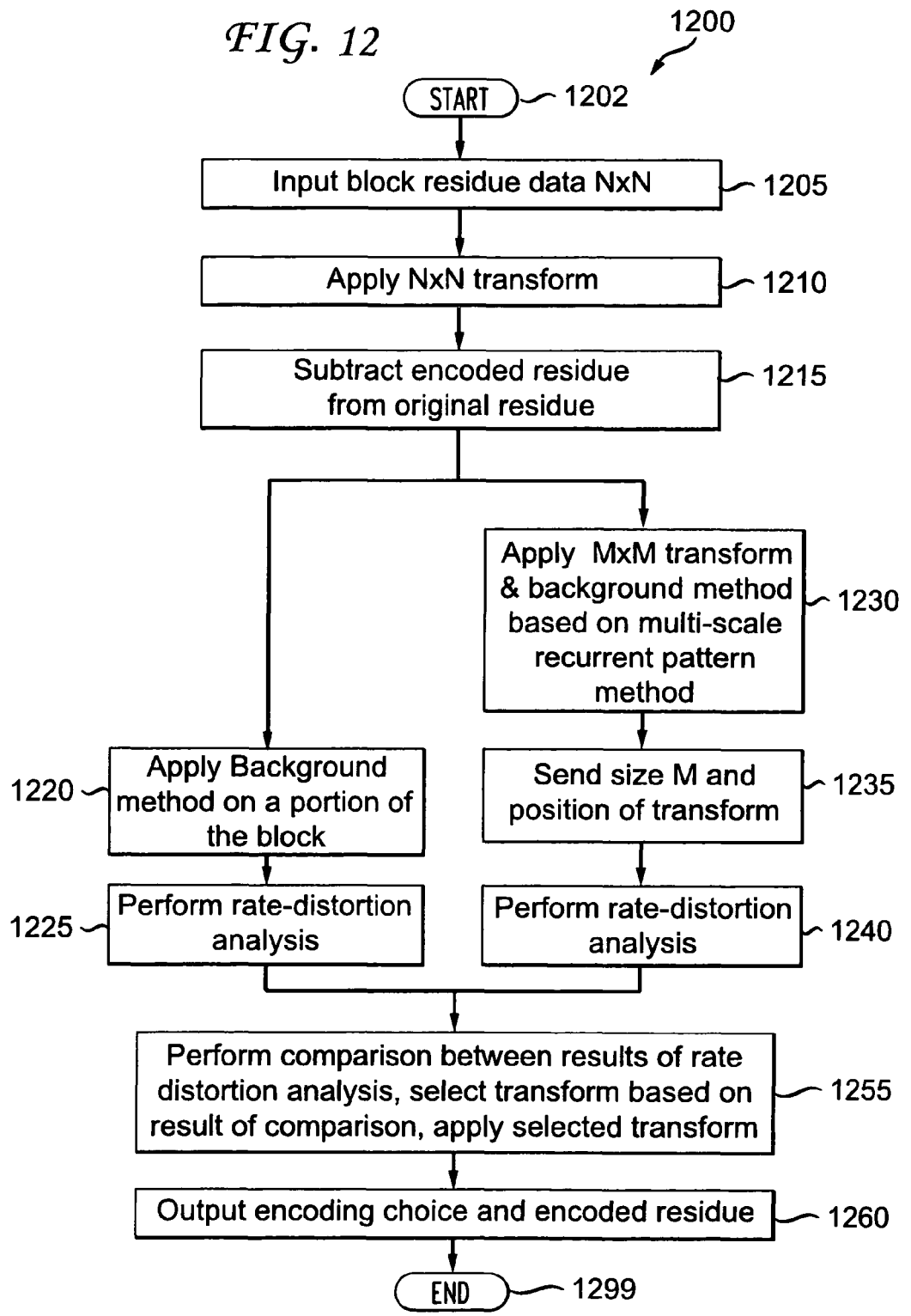

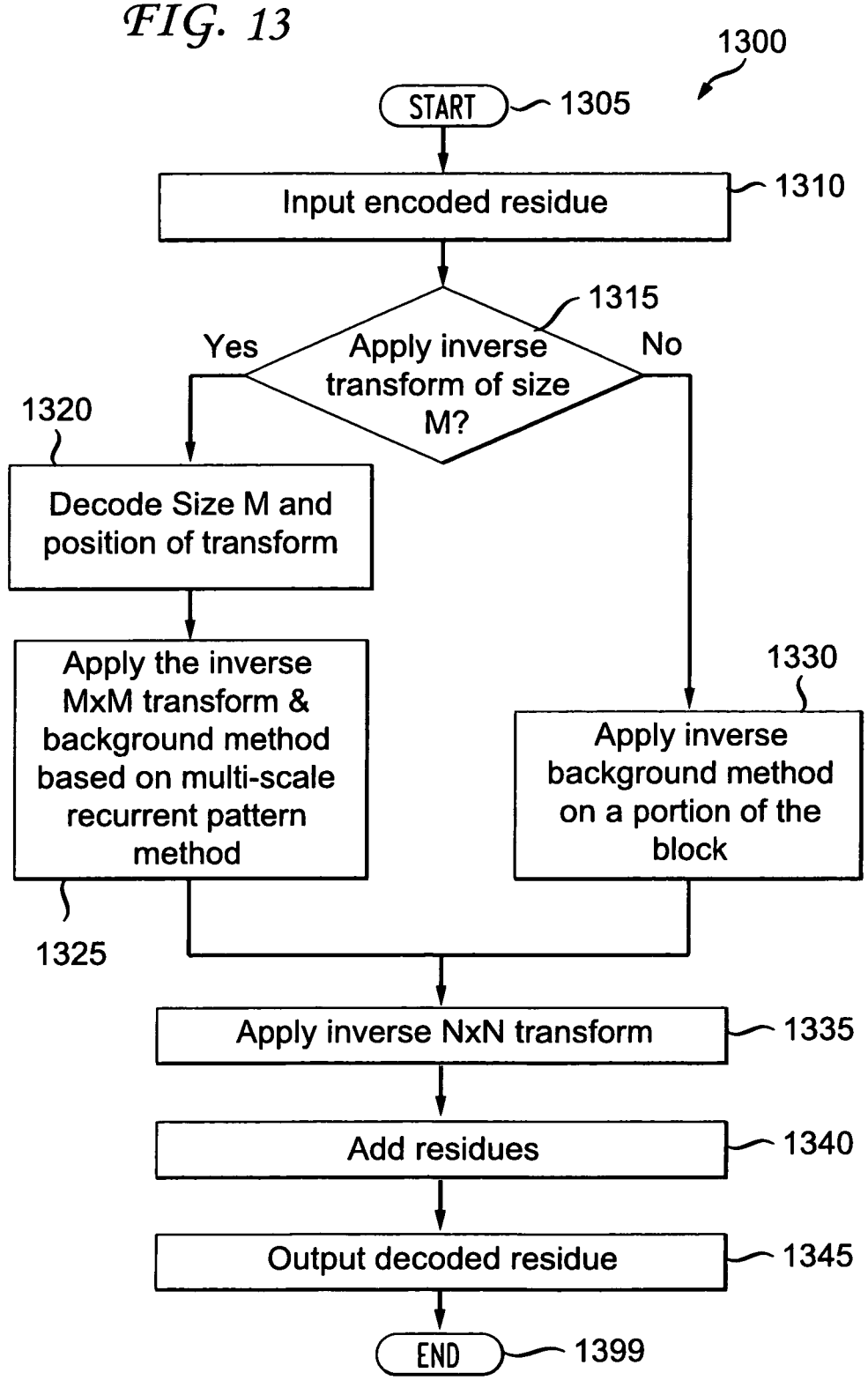

METHODS AND APPARATUS FOR SPATIALLY VARYING RESIDUE CODING

CROSS-REFERENCE TO RELATED APPLICATIONS

This application claims the benefit, under 35 U.S.C. §365 of International Application PCT/US2010/001884, filed Jul. 1, 2010, which was published in accordance with PCT Article 21(2) on Jan. 13, 2011 in English and which claims the benefit of United States provisional patent application No. 61/223,277, filed Jul. 6, 2009.

TECHNICAL FIELD

The present principles relate generally to video encoding and decoding and, more particularly, to methods and apparatus for spatially varying residue coding.

BACKGROUND

The block-based discrete transform is a fundamental component of many image and video compression standards including, for example, the Joint Photographic Experts Group, the International Telecommunication Union, Telecommunication Sector (ITU-T) H.263 Recommendation (hereinafter the "H.263 Recommendation"), the International Organization for Standardization/International Electrotechnical Commission (ISO/IEC) Moving Picture Experts Group-1 (MPEG-1) Standard, the ISO/IEC MPEG-2 Standard, the ISO/IEC MPEG-4 Part 10 Advanced Video Coding (AVC) Standard/ITU-T H.264 Recommendation (hereinafter the "MPEG-4 AVC Standard"), as well as others, and is used in a wide range of applications.

The discrete cosine transform (DCT) is the most extensively used block transform. The DCT scheme takes advantage of the local spatial correlation property of a picture by dividing it into blocks of pixels (usually 4×4 and 8×8), transforming each block from the spatial domain to the frequency domain using the DCT, and quantizing the transform coefficients. Most image and video compression standards use a fixed two-dimensional (2-D) separable DCT block transform. If several block sizes are allowed (typically, from 4×4 to 16×16 blocks), then a DCT with a size corresponding to size of the block is used. However, there is only one transform for each block size and all the pixels in the block are processed with that transform.

In image and video coding standards such as, for example, the MPEG-4 AVC Standard, there is one choice for the block transform to use for each block size. If the residue (i.e., the prediction error) is coded, then such coding is performed via the transform coefficients. All the pixels are transformed. Turning to FIG. 1, some transform sizes in the MPEG-4 AVC Standard are indicated generally by the reference numeral 100. With respect to the depicted transform sizes 100, for an 8×8 block 110 to be coded: the 8×8 block 110 is divided into four 4×4 blocks 121 through 124 that are transformed with a 4×4 transform. In some cases, sending the transform coefficients may not be necessary for some of the 4×4 blocks. For example, with respect to the depicted transform sizes 100, the residue (as represented by the corresponding coefficients) is not sent for the three 4×4 blocks 121, 122, and 123 (depicted without any hatch patterns), while the residue is sent for the remaining 4×4 block 124 (depicted using a diagonal hatch pattern). The main disadvantage is that the spatial support of the transforms is fixed, so the flexibility to encode the residue is significantly reduced.

One prior art approach introduces more flexibility in the residue coding step by proposing a spatially varying transform. Turning to FIG. 2, a spatially varying transform is indicated generally by the reference numeral 200. In such a case, the residue may be coded in accordance with the MPEG-4 AVC Standard, but the spatially varying transform is also allowed. The spatially varying transform is applied only to a sub-block 210 (depicted using a diagonal hatch pattern), leaving the rest of the residue un-coded. Therefore, the sub-block 210 of M×M pixels from an N×N block 220 are transformed. The encoder has to signal the position of the M×M sub-block 210 (that is, the locations x and y). However, this approach still lacks flexibility. For example, the approach lacks flexibility because there is only one transform within the block 220, the approach does not code part of the residue data, and there is no pre-filtering to improve visual quality.

A second prior art approach proposes the so-called Adaptive Prediction Error Coding (APEC) technique. An inter frame residue has low correlation, and the DCT is adequate only for highly correlated data. Therefore, the second prior art approach proposes to enable an adaptive prediction error coding in the spatial and frequency domains. For each block of the prediction error, either transform coding or spatial domain coding is applied. The algorithm with the lower rate-distortion cost is chosen for the block. In sum, the second prior art approach proposes a selection of whether or not to use a transform to code the residue of a block, but ultimately only one of the two following options is applied for each block: all pixels are transformed prior to entropy coding; or all of the pixels are entropy encoded directly in the spatial domain.

SUMMARY

These and other drawbacks and disadvantages of the prior art are addressed by the present principles, which are directed to methods and apparatus for spatially varying residue coding.

According to an aspect of the present principles, there is provided an apparatus. The apparatus includes a video encoder for encoding picture data for at least a block in a picture by selecting a spatially varying encoding method for a residue corresponding to a difference between an original version of the block and at least one reference block. One or more transforms are used to transform a portion of the block and a remaining area of the block is encoded using an alternate encoding method with respect to the one or more transforms or is not encoded.

According to another aspect of the present principles, there is provided a method in a video encoder. The method includes encoding picture data for at least a block in a picture by selecting a spatially varying encoding method for a residue corresponding to a difference between an original version of the block and at least one reference block. One or more transforms are used to transform a portion of the block except and a remaining area of the block is encoded using an alternate encoding method with respect to the one or more transforms or is not encoded.

According to still another aspect of the present principles, there is provided an apparatus. The apparatus includes a video decoder for decoding picture data for at least a block in a picture by selecting a spatially varying decoding method for a residue corresponding to a difference between an original version of the block and at least one reference block. One or more inverse transforms are used to inverse transform a portion of the block and a remaining area of the block being decoded using an alternate decoding method with respect to the one or more inverse transforms.

According to yet another aspect of the present principles, there is provided a method in a video decoder. The method includes decoding picture data for at least a block in a picture by selecting a spatially varying decoding method for a residue corresponding to a difference between an original version of the block and at least one reference block. One or more inverse transforms are used to inverse transform a portion of the block and a remaining area of the block is decoded using an alternate decoding method with respect to the one or more inverse transforms (920). According to an additional aspect of the present principles, there is provided an apparatus. The apparatus includes a video encoder for encoding picture data for at least a block in a picture using multi-tier residue coding. An original residue, corresponding to a difference between an original version of the block and at least one reference block, is encoded using a first encoding method to obtain an encoded residue. The encoded residue is subtracted from the original residue, and a portion of the block is encoded using a second encoding method.

According to another additional aspect of the present principles, there is provided a method in a video encoder. The method includes encoding picture data for at least a block in a picture using multi-tier residue coding. An original residue, corresponding to a difference between an original version of the block and at least one reference block, is encoded using a first encoding method to obtain an encoded residue. The encoded residue is subtracted from the original residue, and a portion of the block is encoded using a second encoding method.

According to yet another additional aspect of the present principles, there is provided an apparatus. The apparatus includes a video decoder for decoding picture data for at least a block in a picture using multi-tier residue decoding. An original residue, corresponding to a difference between an original version of the block and at least one reference block, is decoded using a first decoding method to obtain a decoded residue. The decoded residue is subtracted from the original residue, and a portion of the block is decoded using a second decoding method.

According to still another additional aspect of the present principles, there is provided a method in a video decoder. The method includes decoding picture data for at least a block in a picture using multi-tier residue decoding. An original residue, corresponding to a difference between an original version of the block and at least one reference block, is decoded using a first decoding method to obtain a decoded residue. The decoded residue is subtracted from the original residue, and a portion of the block is decoded using a second decoding method.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

FIG. 8 is a flow diagram showing an exemplary method for performing spatially varying encoding of a block residue, in accordance with an embodiment of the present principles;

FIG. 9 is a flow diagram showing an exemplary method for performing spatially varying decoding of a block residue, in accordance with an embodiment of the present principles.

FIG. 10 is a flow diagram showing another exemplary method for performing spatially varying encoding of a block residue, in accordance with an embodiment of the present principles;

FIG. 11 is a flow diagram showing another exemplary method for performing spatially varying decoding of a block residue, in accordance with an embodiment of the present principles;

FIG. 12 is a flow diagram showing yet another exemplary method for performing spatially varying encoding of a block residue, in accordance with an embodiment of the present principles; and FIG. 13 is a flow diagram showing yet another exemplary method for performing spatially varying decoding of a block residue, in accordance with an embodiment of the present principles.

DETAILED DESCRIPTION

Figure 1:
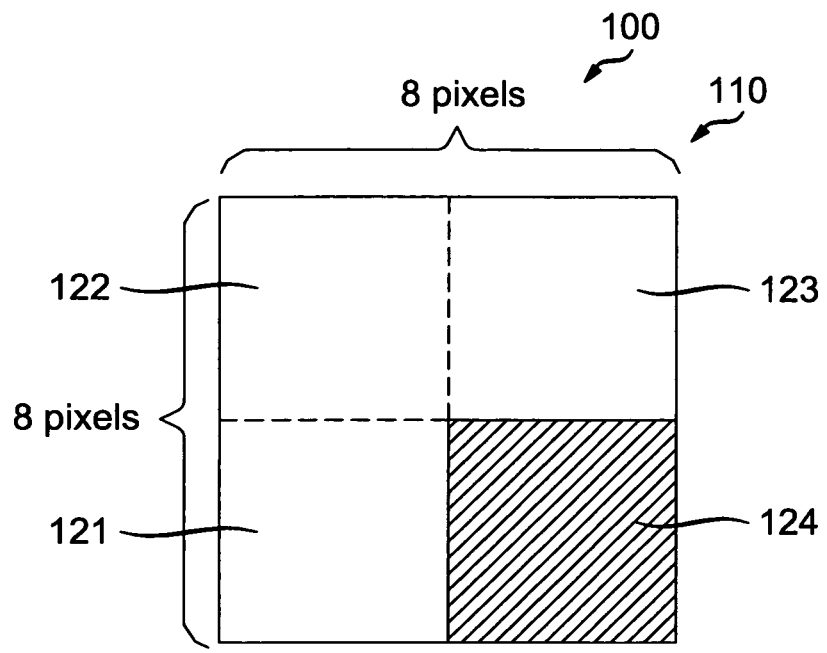
FIG. 1 is a diagram showing some transform sizes in the MPEG-4 AVC Standard.
Figure 2:
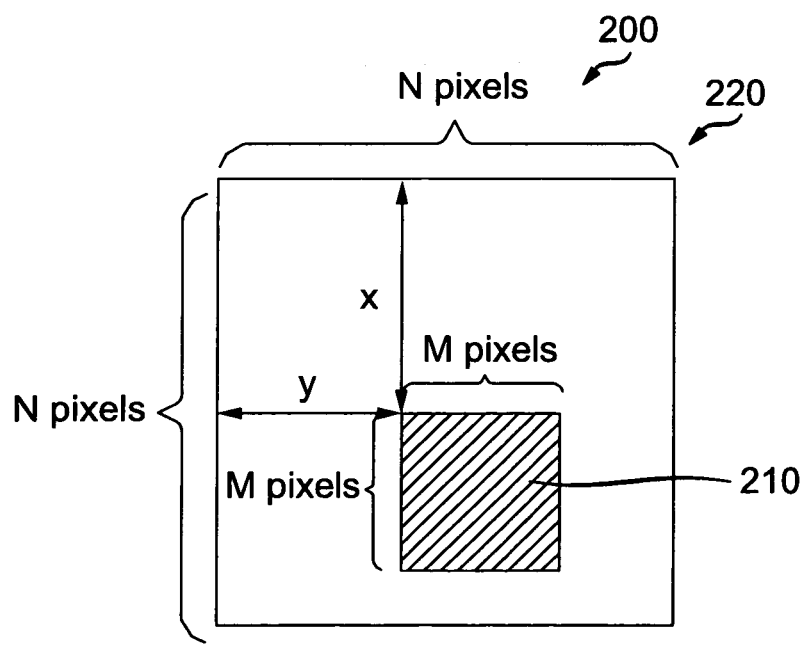
FIG. 2 is a diagram showing a spatially varying transform.

The present principles are directed to methods and apparatus for spatially varying residue coding.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Also, as used herein, the words "picture" and "image" are used interchangeably and refer to a still image or a picture from a video sequence. As is known, a picture may be a frame or a field.

Additionally, as used herein, the word "signal" refers to indicating something to a corresponding decoder. For example, the encoder may signal one or more parameters relating to spatially varying residue coding in order to make the decoder aware of which particular parameters were used on the encoder side. In this way, the same parameters may be used at both the encoder side and the decoder side. Thus, for example, an encoder may transmit a particular parameter to the decoder so that the decoder may use the same particular parameter or, if the decoder already has the particular parameter as well as others, then signaling may be used (without transmitting) to simply allow the decoder to know and select the particular parameter. By avoiding transmission of any actual parameters, a bit savings may be realized. It is to be appreciated that signaling may be accomplished in a variety of ways. For example, one or more syntax elements, flags, and so forth may be used to signal information to a corresponding decoder.

Figure 3:
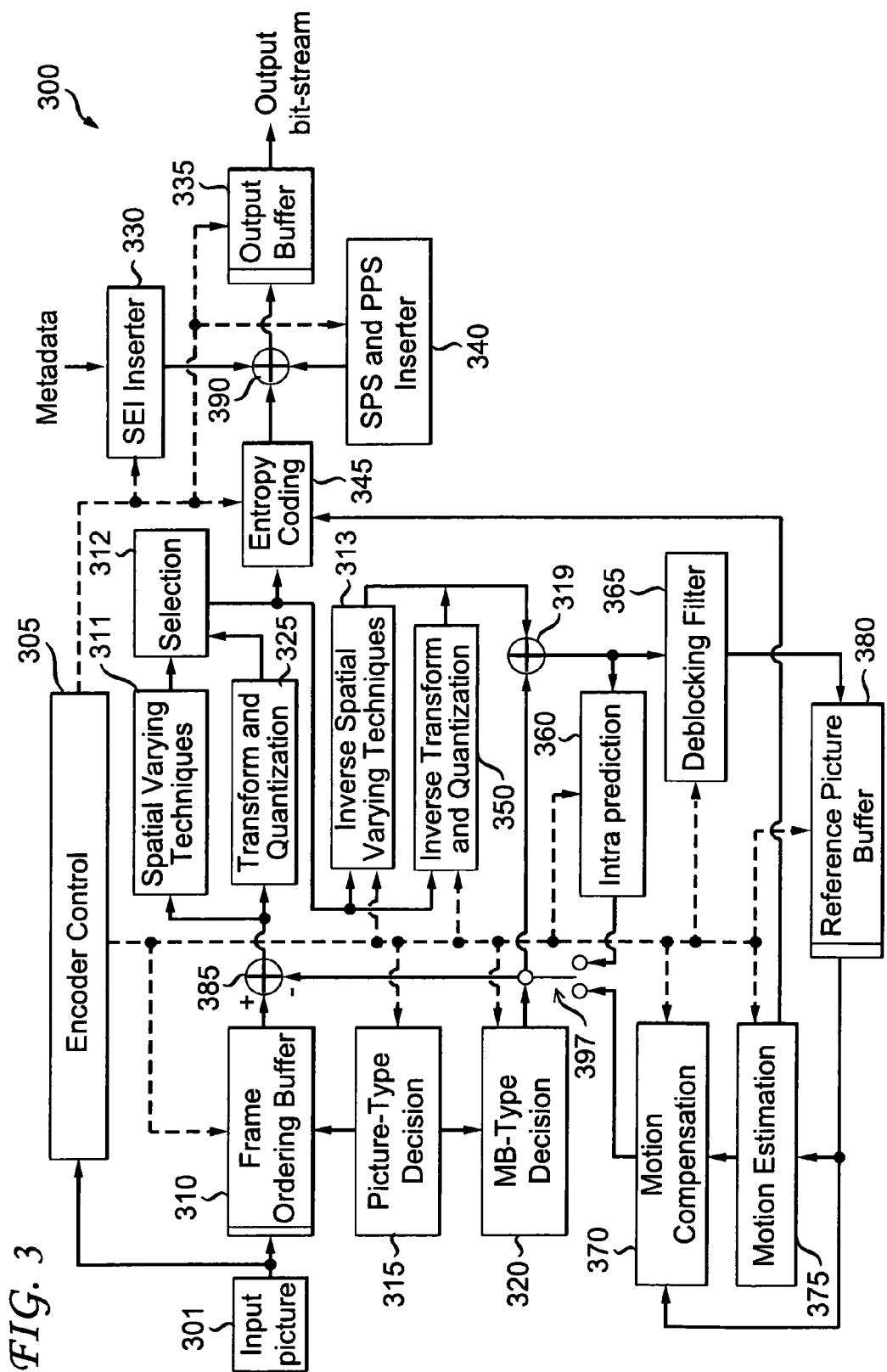
FIG. 3 is a block diagram showing an exemplary video encoder to which the present principles may be applied, in accordance with an embodiment of the present principles.

Turning to FIG. 3, an exemplary video encoder to which the present principles may be applied is indicated generally by the reference numeral 300. The video encoder 300 includes a frame ordering buffer 310 having an output in signal communication with a non-inverting input of a combiner 385. An output of the combiner 385 is connected in signal communication with an input of a transformer and quantizer 325 and an input of a spatially varying techniques module 311. An output of the spatially varying techniques module 311 is connected in signal communication with a first input of a selection module 312. An output of the transformer and quantizer 325 is connected in signal communication with a second input of the selection module 312. An output of the selection module 312 is connected in signal communication with a first input of an entropy coder 345, a first input of an inverse spatial varying techniques module 313, and a first input of an inverse transformer and inverse quantizer 350. An output of the entropy coder 345 is connected in signal communication with a first non-inverting input of a combiner 390. An output of the combiner 390 is connected in signal communication with a first input of an output buffer 335.

A first output of an encoder controller 305 is connected in signal communication with a second input of the frame ordering buffer 310, a second input of the inverse spatial varying techniques module 313, a second input of the inverse transformer and inverse quantizer 350, an input of a picture-type decision module 315, a first input of a macroblock-type (MB-type) decision module 320, a second input of an intra prediction module 360, a second input of a deblocking filter 365, a first input of a motion compensator 370, a first input of a motion estimator 375, and a second input of a reference picture buffer 380.

A second output of the encoder controller 305 is connected in signal communication with a first input of a Supplemental Enhancement Information (SEI) inserter 330, a second input of the entropy coder 345, a second input of the output buffer 335, and an input of the Sequence Parameter Set (SPS) and Picture Parameter Set (PPS) inserter 340.

An output of the SEI inserter 330 is connected in signal communication with a second non-inverting input of the combiner 390.

A first output of the picture-type decision module 315 is connected in signal communication with a third input of the frame ordering buffer 310. A second output of the picture-type decision module 315 is connected in signal communication with a second input of a macroblock-type decision module 320.

An output of the Sequence Parameter Set (SPS) and Picture Parameter Set (PPS) inserter 340 is connected in signal communication with a third non-inverting input of the combiner 390.

An output of the inverse quantizer and inverse transformer 350 and an output of the inverse spatially varying techniques module 313 are connected in signal communication with a first non-inverting input of a combiner 319. An output of the combiner 319 is connected in signal communication with a first input of the intra prediction module 360 and a first input of the deblocking filter 365. An output of the deblocking filter 365 is connected in signal communication with a first input of a reference picture buffer 380. An output of the reference picture buffer 380 is connected in signal communication with a second input of the motion estimator 375 and a third input of the motion compensator 370. A first output of the motion estimator 375 is connected in signal communication with a second input of the motion compensator 370. A second output of the motion estimator 375 is connected in signal communication with a third input of the entropy coder 345.

An output of the motion compensator 370 is connected in signal communication with a first input of a switch 397. An output of the intra prediction module 360 is connected in signal communication with a second input of the switch 397. An output of the macroblock-type decision module 320 is connected in signal communication with a third input of the switch 397. The third input of the switch 397 determines whether or not the "data" input of the switch (as compared to the control input, i.e., the third input) is to be provided by the motion compensator 370 or the intra prediction module 360. The output of the switch 397 is connected in signal communication with a second non-inverting input of the combiner 319 and an inverting input of the combiner 385.

A first input of the frame ordering buffer 310 and an input of the encoder controller 305 are available as inputs of the encoder 100, for receiving an input picture 301. Moreover, a second input of the Supplemental Enhancement Information (SEI) inserter 330 is available as an input of the encoder 300, for receiving metadata. An output of the output buffer 335 is available as an output of the encoder 300, for outputting a bitstream.

Figure 4:
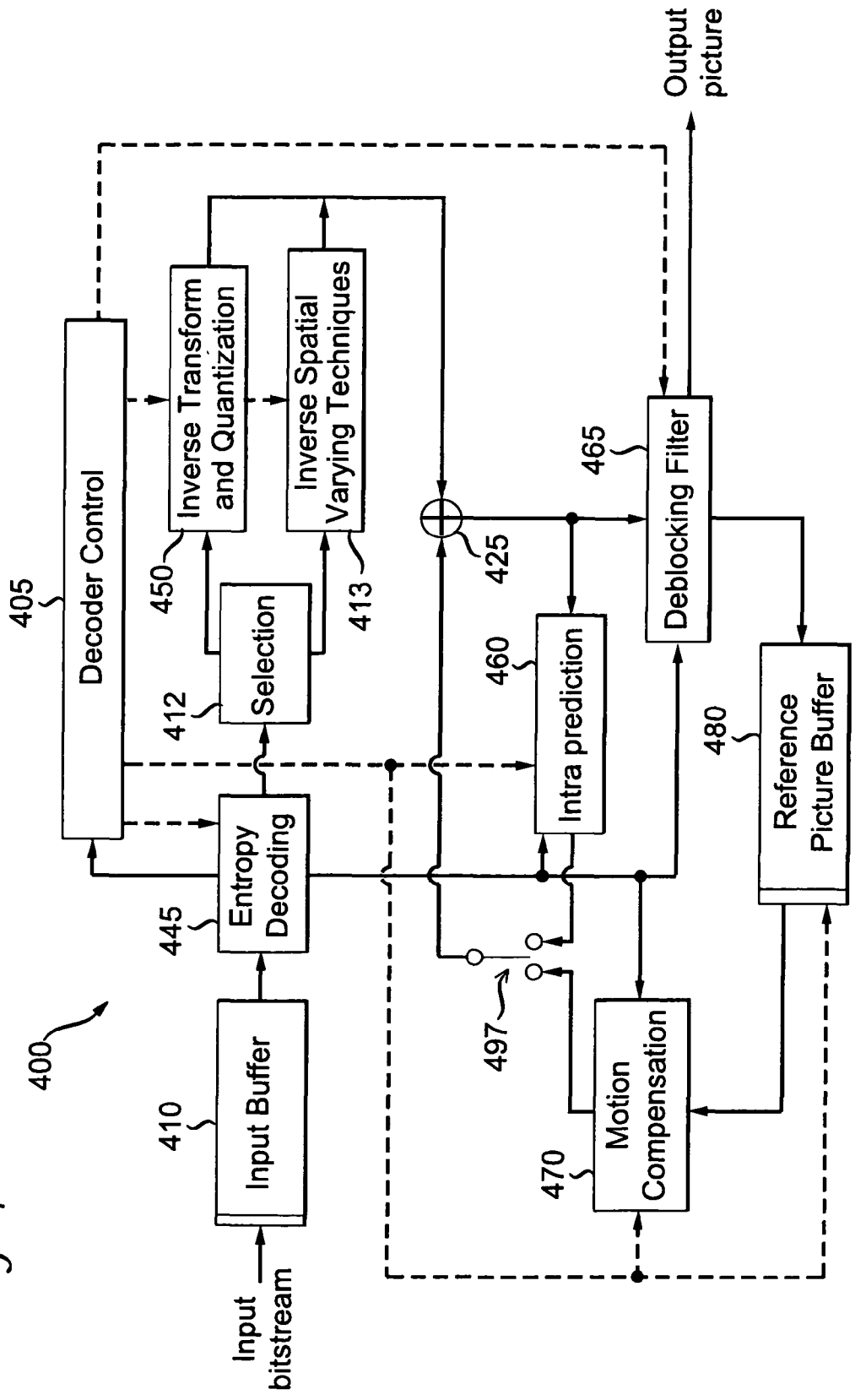
FIG. 4 is a block diagram showing an exemplary video decoder to which the present principles may be applied, in accordance with an embodiment of the present principles.

Turning to FIG. 4, an exemplary video decoder to which the present principles may be applied is indicated generally by the reference numeral 400. The video decoder 400 includes an input buffer 410 having an output connected in signal communication with a first input of an entropy decoder 445. A first output of the entropy decoder 445 is connected in signal communication with an input of a selector 412. An output of the selector 412 is connected in signal communication with a first input of an inverse transformer and inverse quantizer 450 and a first input of an inverse spatial varying techniques module 413. An output of the inverse transformer and inverse quantizer 450 and an output of the inverse spatial varying techniques module 413 are connected in signal communication with a second non-inverting input of a combiner 425. An output of the combiner 425 is connected in signal communication with a second input of a deblocking filter 465 and a first input of an intra prediction module 460. A second output of the deblocking filter 465 is connected in signal communication with a first input of a reference picture buffer 480. An output of the reference picture buffer 480 is connected in signal communication with a second input of a motion compensator 470.

A second output of the entropy decoder 445 is connected in signal communication with a third input of the motion compensator 470, a first input of the deblocking filter 465, and a third input of the intra predictor 460. A third output of the entropy decoder 445 is connected in signal communication with an input of a decoder controller 405. A first output of the decoder controller 405 is connected in signal communication with a second input of the entropy decoder 445. A second output of the decoder controller 405 is connected in signal communication with a second input of the inverse transformer and inverse quantizer 450. A third output of the decoder controller 405 is connected in signal communication with a third input of the deblocking filter 465. A fourth output of the decoder controller 405 is connected in signal communication with a second input of the intra prediction module 460, a first input of the motion compensator 470, and a second input of the reference picture buffer 480. A fifth output of the decoder controller 405 is connected in signal communication with a second input of the inverse spatial varying techniques module 413.

An output of the motion compensator 470 is connected in signal communication with a first input of a switch 497. An output of the intra prediction module 460 is connected in signal communication with a second input of the switch 497. A fourth output of the entropy decoder 445 is connected in signal communication with a third input of the switch 497. The third input of the switch 497 determines whether or not the "data" input of the switch (as compared to the control input, i.e., the third input) is to be provided by the motion compensator 470 or the intra prediction module 460. An output of the switch 497 is connected in signal communication with a first non-inverting input of the combiner 425.

An input of the input buffer 410 is available as an input of the decoder 400, for receiving an input bitstream. A first output of the deblocking filter 465 is available as an output of the decoder 400, for outputting an output picture.

Most modern video coding standards employ transforms to efficiently reduce the correlation of the residue in the spatial domain. The transforms size is usually determined by the size of the prediction data. Also, transform coding is not combined with other coding techniques to deal with the varying characteristics of the residue. In these schemes, where there is only one transform for each block size and the all the pixels in the block are processed with that transform, there is a limitation. The image and video content data has varying statistics and properties. Therefore, there are potential compression gains if several transforms are used for each block and other techniques are allowed to compress some of the residue data. We recognize this inefficiency and, therefore, in accordance with the present principles, propose methods and apparatus for combining the use of several transforms in a block at the same time, while also allowing other techniques to code the residue data that is not transformed. In a preferred embodiment, we enhance this approach through the use of pre-filtering and post-filtering techniques to improve visual quality and efficiency. Thus, in one or more embodiments, the present principles make uses of spatial-varying transforms and coding methods of the residue and complementary filtering techniques to improve efficiency and visual quality of the image and video data.

Spatial Varying Techniques for Residue Coding

Video coding technology is moving to satisfy the requirements of increased usage of larger display resolutions and High-Definition (HD) content. High definition content coding efficiency benefits from larger block units. Therefore, the prediction unit and the resulting residue transform become larger. Typically, the block size is being enlarged from 4×4 or 8×8 blocks to 32×32 or 64×64 blocks. There are even proposals of using coding units as large as 128×128 pixels.

On the other hand, prediction techniques are rapidly improving, leading to residue data with low spatial correlation and sparsity properties quite different from previous video coding standards.

As a consequence of these two trends (larger units and better prediction), the DCT approach does not properly deal with residue coding. There is need for new technology that is able to adapt to the spatial variability of the residue.

In accordance with the present principles, we propose to combine different transforms and other techniques in order to code the residue of a block. In this way, it is possible to take advantage of the observed spatial correlation on some parts of the residue data and, at the same time, take advantage of the observed sparsity of other parts of the residue of the same block. It is to be appreciated that the present principles are suited for the new codec paradigm with larger blocks and improved prediction methods, as well as existing video coding standards, recommendations, and extensions thereof involving smaller blocks. That is, the present principles may be applied to video coding standards, recommendations, and extensions thereof involving any block size.

Figure 5:
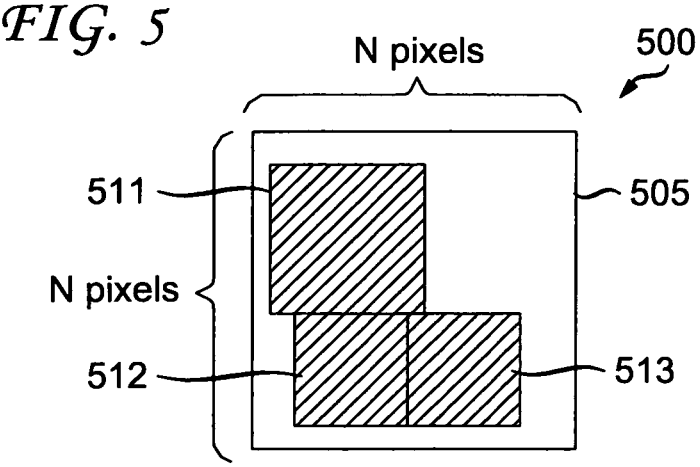
FIG. 5 is a diagram showing an example of spatially varying residue coding, in accordance with an embodiment of the present principles.

Turning to FIG. 5, an example of spatially varying residue coding is indicated generally by the reference numeral 500. The spatially varying residue coding 500 involves N pixels by N pixels of picture data that form a block 505. The block 505 is coded with one or more transforms that do not necessarily cover the entire block 505. For example, sub-blocks 511 through 513 (depicted using a diagonal hatch pattern) within the block 505 do not cover the block. Sub-blocks 511 through 513 are coded by the one or more transforms. Then, the remaining residue (un-hatched background) is coded with an alternative method. This alternative method (hereinafter referred to as the "background method") may be spatial domain coding, for example, corresponding to the second prior art approach described above, or may involve some other alternative method as would be known to one of ordinary skill in this and related arts. In another embodiment, the background method may be a Lempel-ziv method, or involve a multi-scale recurrent pattern, or a multi-scale recurrent pattern with adaptive probability models, or vector quantization, or so forth. It is to be appreciated that, given the teachings of the present principles provided herein, one of ordinary skill in this and related arts will contemplate these and many other options for encoding the remaining residue. Moreover, it is to be further appreciated that two or more of these (background) methods can be combined to encode the remaining residue. Finally, the encoder can have the choice to use the "traditional" transform scheme or the proposed spatially varying techniques, so the encoder may profit from the new technology while keeping the option to use the transform for the whole block (the latter having been proven to work well in many but certainly not all situations).

In this setting, the encoder has to indicate the number of transforms, their size, and positions, and also, what is the selected background method to encode the remaining residue. These parameters may be fixed, for example, by design, or at the sequence level, the frame level, the slice level, and/or some other level and, thus, some or all of these parameters may not necessarily have to be indicated every time.

The position of the set of transforms within the block may be adaptive. In one embodiment, the encoder explicitly indicates the position of each transform. The parameters to send may include, but are not limited to, for example: (1) the x and y of each transform; (2) the x and y relative to a previous transform; or (3) other values equivalent to x and y, like the angle and modulus of the (relative) position. Of course, given the teachings of the present principles provided herein, one of ordinary skill in this and related arts will contemplate these and other parameters that may be sent in accordance with the present principles, while maintaining the spirit and scope of the present principles.

In another embodiment, the decoder deduces the position of (at least some of) the transforms from previously reconstructed data and encoding selections. For example, the position and number of the transforms may depend on, but are not limited to, the prediction data, the prediction mode, the previous residue or the motion vector of previous blocks, and so forth. The selection depends on data available at both encoder and decoder, so they can make the same decision and thus, be in synchrony (thus obviating the need to send side information in support of the same).

In general, the proposed methods may bring more gains when the transforms do not overlap with each other, but in some situations such an overlap may benefit the performance. In one or more embodiments, the proposed methods do not restrict the location of the transforms and background methods, that is, they may overlap.

Figure 6:
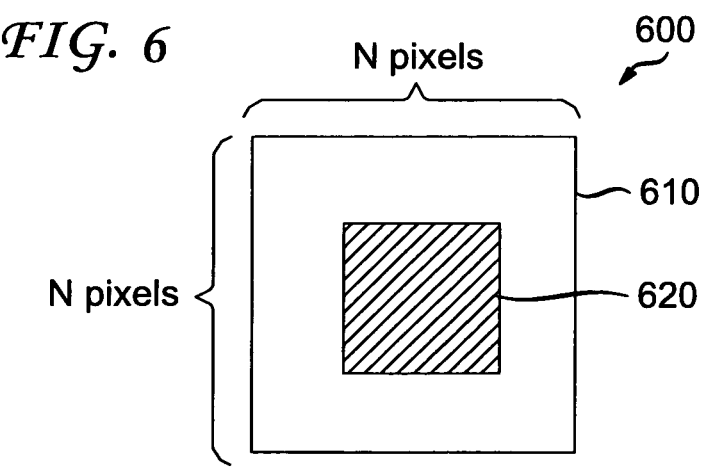
FIG. 6 is a diagram showing an example of spatially varying residue coding, involving a combination of two totally overlapping transforms, in accordance with an embodiment of the present principles.

This point leads to another embodiment involving multi-tier residue coding. Turning to FIG. 6, an example of spatially varying residue coding, involving a combination of two totally overlapping transforms, is indicated generally by the reference numeral 600. In this case, the residue is first encoded with one method. Then, this encoded residue is subtracted from the original residue. After that, the remaining residue is encoded with another method. A good example of this method is the following:

1. Encode the block (N×N) 610 using the transform approach.

2. Keep only the largest low frequency coefficients of the transform.

3. Subtract the encoded residue from the original residue.

4. Encode (one or more) sub-blocks (e.g., M×M sub-block 620, depicted using a diagonal hatch pattern) using a transform.

This multi-tier residue coding method uses two layers of residue and it is spatially varying. The first tier gives a broad description of the residue for the entire block 610. The second tier may focus on an area especially difficult to encode or an area of interest (e.g., sub-block 620), so the second tier refines the first tier for that particular area. This approach can be easily extended to signal-to-noise ratio (SNR) scalability in scalable video coding (SVC).

This is only an example. Thus, it is to be appreciated that the present principles are not limited to the case that the two (or more) layers rely on transform coding. For example, the second layer could be encoded with the spatial domain approach. These and other variations are readily contemplated by one of ordinary skill in this and related arts, given the teachings of the present principles provided herein.

Filtering for Spatial Varying Techniques for Residue Encoding

The spatial varying techniques lead to neighboring data reconstructed with different methods or transforms and, thus, may in turn lead to artifacts along the borders, similar to the blocking artifacts found in most video coding standards and so forth. The artifacts can be reduced or eliminated if filtering is performed. This filtering can be a deblocking filter, a low pass filter, a nonlinear filter, a lapped transform, and so forth. The transform type and sizes, the quantization level, and other coding parameters determine the best choice for this filtering.

Figure 7:
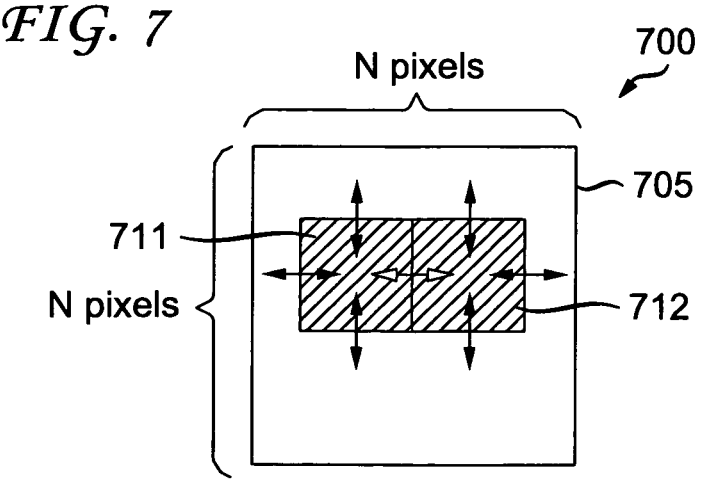
FIG. 7 is a diagram showing an example of spatially varying residue coding, involving filtering, in accordance with an embodiment of the present principles.

Turning to FIG. 7, an example of spatially varying residue coding, involving filtering, is indicated generally by the reference numeral 700. As shown, filtering across a (e.g., sub-block) border within a block 705 can be performed. The filtering can be different depending on the neighboring regions. For example, a deblocking filter can be used across (white arrows in FIG. 7) two transform sub-blocks 711 and 712 (depicted using a diagonal hatch pattern), while a low pass filtering can be used across (black arrows in FIG. 7) the transform sub-blocks 711 and 712 (depicted using a diagonal hatch pattern) and the neighboring region (depicted without any hatch patterns) encoded with the background method.

In an embodiment, all these filters are applied after the reconstruction of the block. However, in another embodiment, there is the alternative to pre-filter the data before coding it with spatial varying techniques. In this case, first a filter is applied across the regions to be coded with different techniques and, then, this filtered residue is encoded.

At the decoder, the inverse process is applied. First, the residue is decoded using the spatial varying method and, then, inverse filtering across the regions is applied.

An example of such a filter is the linear filter F:

$$F = \begin{bmatrix} 1+a & b & -b & -a \\ c & 1+d & -d & -c \\ -c & -d & 1+d & c \\ -a & -b & b & 1+a \end{bmatrix}$$

Where a, b, c, d are parameters of the filter. This is a 1-D linear filter that is applied to 4 pixels at the border: 2 in one side and 2 in the other side of the region limit. Of course, it is to be appreciated that the present principles are not limited solely to the preceding filter and, thus, nonlinear, adaptive, 2-D, and many other variants of a filter may be utilized in accordance with the present principles, while maintaining the spirit and scope of the present principles.

At the decoder side, the inverse filter $F^{-1}$ is to be applied.

In sum, in one or more embodiments, we propose filtering coordinated with the spatial varying techniques for residue coding. In one embodiment, a pre-filter is used (before residue encoding). In another embodiment, a post-filter is used (after residue encoding). In yet another embodiment, both pre-filters and post-filters are used.

Turning to FIG. 8, an exemplary method for performing spatially varying encoding of a block residue is indicated generally by the reference numeral 800. The method 800 includes a start block 805 that passes control to a function block 810. The function block 810 inputs block residue data of size N×N, and passes control to a function block 815 and function block 820. The function block 815 applies a transform of size N×N to the block residue data, and passes control to a function block 825. The function block 825 performs a rate-distortion analysis (based on a result of applying the transform of size N×N), and passes control to a function block 835. The function block 820 applies K transforms of size Mk×Mk and a background method to the block residue data, and passes control to a function block 823. The function block 823 filters across parts of the block using different transforms or methods, and passes control to a function block 830. The function block 830 performs a rate-distortion analysis (based on a result of applying the K transforms of size Mk×Mk and the background method), and passes control to the function block 835.

The function block 835 performs a comparison between the respective results of the respective rate distortion analysis performed by the function blocks 825 and 830, a selects a transform to apply based upon a result of the comparison, applies the selected transform to encode the residue, and passes control to a function block 840. The function block 840 outputs the selected transform and encoded residue, and passes control to an end block 899.

Turning to FIG. 9, an exemplary method for performing spatially varying decoding of a block residue is indicated generally by the reference numeral 900. The method 900 includes a start block 905 that passes control to a function block 910. The function block 910 inputs an encoded residue, and passes control to a decision block 915. The decision block 915 determines whether or not to perform spatial varying residue decoding (according to what the encoder has done, i.e., decodes the decision taken at encoder). If so, then control is passed to a function block 920. Otherwise, control is passed to a function block 925. The function block 920 applies K inverse transforms of size Mk×Mk and inverse background method to the encoded residue, and passes control to the function block 923. The function block 923 filters across parts of the block using different transforms or methods, and passes control to a function block 925. The function block 925 applies an inverse N×N transform to the encoded residue, and passes control to the function block 930. The function block 930 outputs the resultant residue data, and passes control to an end block 999.

Turning to FIG. 10, another exemplary method for performing spatially varying encoding of a block residue is indicated generally by the reference numeral 1000. The method 1000 includes a start block 1005 that passes control to a function block 1010. The function block 1010 inputs block residue data of size N×N, and passes control to a function block 1020 and a function block 1040. The function block 1020 applies a transform of size N×N, and passes control to a function block 1025. The function block 1025 subtracts the encoded residue from the original residue, and passes control to a function block 1030. The function block 1030 applies an M×M transform of size M×M, and passes control to a function block 1050. The function block 1050 performs a rate-distortion analysis (based on a result of applying the transform of size M×M), and passes control to a function block 1060. The function block 1040 applies a transform of size M×M and a background method based on a multi-scale recurrent pattern method, and passes control to a function block 1045. The function block 1045 sends the size M and the position of the transform, and passes control to a function block 1055. The function block 1055 performs a rate-distortion analysis (based on a result of applying the transform of size M×M), and passes control to the function block 1060. The function block 1060 performs a comparison between the results of the rate-distortion analyses, selects a transform based on a result of the comparison, applies the selected transform, and passes control to a function block 1065. The function block 1065 outputs the encoding choice and the encoded residue, and passes control to a function block 1099.

Turning to FIG. 11, another exemplary method for performing spatially varying decoding of a block residue is indicated generally by the reference numeral 1100. The method 1100 includes a start block 1105 that passes control to a function block 1110. The function block 1110 inputs an encoded residue, and passes control to a decision block 1115. The decision block 1115 determines whether or not a multi-tiered decoding method is to be used. If so, then control is passed to a function block 1130. Otherwise, control is passed to a function block 1150. The function block 1130 decodes the size M and the position of the transform, and passes control to a function block 1140. The function block 1140 applies the inverse M×M transform and a background method based on a multi-scale recurrent pattern method, and passes control to a function block 1170. The function block 1150 applies an inverse transform of size M×M, and passes control to a function block 1155. The function block 1155 applies an inverse transform of size N×N, and passes control to a function block 1160. The function block 1160 adds the residues from the N×N and M×M transforms, and passes control to the function block 1170. The function block 1170 outputs the encoded residue, and passes control to an end block 1199.

Turning to FIG. 12, yet another exemplary method for performing spatially varying encoding of a block residue is indicated generally by the reference numeral 1200. The method 1200 includes a start block 1202 that passes control to a function bloc 1205. The function block 1205 inputs block residue data of size N×N corresponding to an original residue, and passes control to a function block 1210. The function block 1210 applies an N×N transform (to the original residue to obtain an encoded residue), and passes control to a function block 1215. The function block 1215 subtracts the encoded residue from the original residue, and passes control to a function block 1220 and a function block 1230. The function 1220 applies a background method on a portion of the block, and passes control to a function block 1225. The function block 1225 performs a rate distortion analysis (based on a result of applying the background method to the portion of the block), and passes control to a function block 1255.

The function block 1230 applies an M×M transform and a background method based on a multi-scale recurrent pattern method, and passes control to a function block 1235. The function block 1235 sends the size M and a position of the transform, and passes control to a function block 1240. The function block 1240 performs a rate-distortion analysis (based on a result of applying the M×M transform and the background method), and passes control to the function block 1255.

The function block 1255 performs a comparison between the results of the rate-distortion analyses, selects a transform based on a result of the comparison, applies the selected transform, and passes control to a function block 1260. The function block 1260 outputs the encoding choice and the encoded residue, and passes control to an end block 1299.

Turning to FIG. 13, yet another exemplary method for performing spatially varying decoding of a block residue is indicated generally by the reference numeral 1300. The method 1300 includes a start block 1305 that passes control to a function block 1310. The function block 1310 inputs an encoded residue, and passes control to a decision block 1315. The decision block 1315 determines whether or not to apply an inverse transform of size M. If so, then control is passed to a function block 1320. Otherwise, control is passed to a function block 1330. The function block 1320 decodes the size M and the position of the transform, and passes control to a function block 1325. The function block 1325 applies the inverse M×M transform and the background method based on a multi-scale recurrent pattern method, and passes control to a function block 1335. The function block 1330 applies an inverse background method on a portion of the block, and passes control to the function block 1335. The function block 1335 applies an inverse N×N transform, and passes control to a function block 1340. The function block 1340 adds the residues, and passes control to a function block 1345. The function block 1345 outputs the decoded residue, and passes control to an end block 1399.

A description will now be given of some of the many attendant advantages/features of the present invention, some of which have been mentioned above. For example, one advantage/feature is an apparatus having a video encoder for encoding picture data for at least a block in a picture by selecting a spatially varying encoding method for a residue corresponding to a difference between an original version of the block and at least one reference block, wherein one or more transforms are used to transform a portion of the block and a remaining area of the block is encoded using an alternate encoding method with respect to the one or more transforms or is not encoded.

Another advantage/feature is the apparatus having the video encoder as described above, wherein the spatially varying encoding method is used in multi-tier residue coding.

Yet another advantage/feature is the apparatus having the video encoder as described above, wherein one or more filters are used to filter the residue to reduce or eliminate encoding artifacts therein.

Still another advantage/feature is the apparatus having the video encoder wherein one or more filters are used to filter the residue to reduce or eliminate encoding artifacts therein as described above, wherein the one or more filters are configured as one or more pre-processing filters, one or more post-processing filters, or a combination of one or more pre-processing filters and one or more post-processing filters.

Moreover, another advantage/feature is the apparatus having the video encoder as described above, wherein the alternate encoding method comprises at least one of a non-transform based encoding method, a Lempel-ziv method, a multi-scale recurrent pattern method, the multi-scale recurrent method with adaptive probability models, and a vector quantization method.

Further, another advantage/feature is the apparatus having the video encoder as described above, wherein at least a subset of parameters of the spatial varying encoding method are transmitted to a corresponding decoder, the parameters comprising at least one of a number of the one or more transforms to be applied, a size of the one or more transforms, positions of the one or more transforms, and the alternate encoding method.

Also, another advantage/feature is the apparatus having the video encoder wherein at least a subset of parameters of the spatial varying encoding method are transmitted to a corresponding decoder, the parameters comprising at least one of a number of the one or more transforms to be applied, a size of the one or more transforms, positions of the one or more transforms, and the alternate encoding method as described above, wherein remaining parameters in the subset are fixed and known by said encoder and the corresponding decoder.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. In a video decoder, a method, comprising:
    decoding residue of a block of a picture in a video sequence from a bitstream;
    wherein said decoding includes:
        selecting a first decoding method to decode a first residue of a first sub-block of the block using a first inverse transform and selecting at least an alternate decoding method to decode a second residue of at least a second sub-block of the block using a second inverse transform, and
        applying said first inverse transform on said first residue of said first sub-block and applying said second inverse transform on said second residue of said at least a second sub-block to obtain decoded residues for said first sub-block and for said second sub-block,
        wherein the first inverse transform is different than the second inverse transform, and
        wherein a position of an inverse transform is based on at least one of prediction data, a prediction mode, residue, and a motion vector of a previous block.

2. The method of claim 1, further comprising filtering at least a portion of residue using at least a filter to reduce or eliminate encoding artifacts therein.

3. The method of claim 2, wherein the at least a filter is configured as a pre-processing filter.

4. The method of claim 1, wherein the block is a prediction unit.

5. The method of claim 1, wherein the number of inverse transforms used for the block is based on at least one of said prediction data, said prediction mode, said residue, and said motion vector of said previous block.

6. An apparatus comprising:
    a video decoder configured to decode a residue of a block of a picture in a video sequence from a bitstream;
    wherein the video decoder is configured to:
        select a first decoding method to decode a first residue of a first sub-block of the block using a first inverse transform and at least an alternate decoding method to decode a second residue of at least a second sub-block of the block using a second inverse transform, and
        apply said first inverse transform on said first residue of said first sub-block and applying said second inverse transform on said second residue of said at least a second sub-block to obtain decoded residues for said first sub-block and for said second sub-block,
        wherein the first inverse transform is different than the second inverse transform, and
        wherein a position of an inverse transform is based on at least one of prediction data, a prediction mode, residue, and a motion vector of a previous block.

7. The apparatus of claim 6, wherein the video decoder comprises at least a memory and one or more processors.

8. The apparatus of claim 6, further comprising at least a filter configured to filter at least a portion of residue to reduce or eliminate encoding artifacts therein.

9. The apparatus of claim 8, wherein the at least a filter is configured as a pre-processing filter.

10. The apparatus of claim 6, wherein the block is a prediction unit.

11. The apparatus of claim 6, wherein the number of inverse transforms used for the block is based on at least one of said prediction data, said prediction mode, said residue, and said motion vector of said previous block.

12. In a video encoder, a method, comprising:
    encoding residue of a block of a picture in a video sequence into a bitstream;
    wherein said encoding includes:
        selecting a first encoding method to encode a first residue of a first sub-block of the block using a first transform and selecting at least an alternate encoding method to encode a second residue of at least a second sub-block of the block using a second transform, and
        applying said first transform on said first residue of said first sub-block and applying said second transform on said second residue of said at least a second sub-block to obtain encoded residues for said first sub-block and for said second sub-block,
        wherein the first inverse transform is different than the second inverse transform, and
        wherein a position of an inverse transform is based on at least one of prediction data, a prediction mode, residue, and a motion vector of a previous block.

13. The method of claim 12, further comprising filtering at least a portion of residue using at least a filter to reduce or eliminate encoding artifacts therein.

14. The method of claim 13, wherein the at least a filter is configured as a pre-processing filter.

15. The method of claim 12, wherein the block is a prediction unit.

16. The method of claim 12, wherein the number of inverse transforms used for the block is based on at least one of said prediction data, said prediction mode, said residue, and said motion vector of said previous block.

17. An apparatus comprising:
a video encoder configured to encode a residue of a block of a picture in a video sequence into a bitstream;
wherein the encoder is configured to:
select a first encoding method to encode a first residue of a first sub-block of the block using a first transform and at least an alternate encoding method to encode a second residue of at least a second sub-block of the block using a second transform, and
apply said first transform on said first residue of said first sub-block and applying said second transform on said second residue of said at least a second sub-block to obtain encoded residues for said first sub-block and for said second sub-block,
wherein the first inverse transform is different than the second inverse transform, and
wherein a position of an inverse transform is based on at least one of prediction data, a prediction mode, residue, and a motion vector of a previous block.

18. The apparatus of claim 17, wherein the video encoder comprises at least a memory and one or more processors.

19. The apparatus of claim 17, further comprising at least a filter configured to filter at least a portion of residue to reduce or eliminate encoding artifacts therein.

20. The apparatus of claim 19, wherein the at least a filter is configured as a pre-processing filter.

21. The apparatus of claim 17, wherein the block is a prediction unit.

22. The apparatus of claim 17, wherein the number of inverse transforms used for the block is based on at least one of said prediction data, said prediction mode, said residue, and said motion vector of said previous block.

23. A non-transitory processor readable medium having stored thereon an encoded bitstream, the encoded bitstream comprising:
an encoded residue of a block of a picture;
wherein a first spatially varying encoding method is selected to encode a first residue of a first sub-block of the block using a first transform, and at least an alternate encoding method is selected to encode a second residue of at least a second sub-block of the block using a second transform, apply said first transform on said first residue of said first sub-block and applying said second transform on said second residue of said at least a second sub-block to obtain encoded residues for said first sub-block and for said second sub-block,
wherein the first inverse transform is different than the second inverse transform, and
wherein a position of an inverse transform is based on at least one of prediction data, a prediction mode, residue, and a motion vector of a previous block.

24. The medium of claim 23, wherein at least a portion of residue is filtered using at least a filter to reduce or eliminate encoding artifacts therein.

25. The medium of claim 24, wherein the at least a filter is configured as a pre-processing filter.

26. The medium of claim 23, wherein the block is a prediction unit.

27. The medium of claim 23, wherein the number of inverse transforms used for the block is based on at least one of said prediction data, said prediction mode, said residue, and said motion vector of said previous block.

28. An apparatus comprising:
a transmitter configured to transmit a bitstream comprising an encoded residue of a block of a picture;
wherein encoding includes selecting a first encoding method to encode a first residue of a first sub-block of the block using a first transform and selecting at least an alternate encoding method to encode a second residue of at least a second sub-block of the block using a second transform, apply said first transform on said first residue of said first sub-block and applying said second transform on said second residue of said at least a second sub-block to obtain encoded residues for said first sub-block and for said second sub-block,
wherein the first inverse transform is different than the second inverse transform, and
wherein a position of an inverse transform is based on at least one of prediction data, a prediction mode, residue, and a motion vector of a previous block.

29. The apparatus of claim 28, further comprising at least a filter configured to filter at least a portion of residue to reduce or eliminate encoding artifacts therein.

30. The apparatus of claim 29, wherein the at least a filter is configured as a pre-processing filter.

31. The apparatus of claim 28, wherein the block is a prediction unit.

32. The apparatus of claim 28, wherein the number of inverse transforms used for the block is based on at least one of said prediction data, said prediction mode, residue, and said motion vector of said previous block.

* * * * *